United States Patent [19]
Baumgartner et al.

[11] 3,793,544
[45] Feb. 19, 1974

[54] MULTIPLE WINDING, MULTIPLE VOLTAGE, ALTERNATOR SYSTEM

[75] Inventors: Kenneth A. Baumgartner, Peoria, Ill.; Jimmie J. Cathey, Bryan, Tex.; Norbert L. Schmitz, Middleton, Wis.

[73] Assignee: Caterpillar Tractor Co., Peoria, Ill.

[22] Filed: Feb. 10, 1972

[21] Appl. No.: 225,068

[52] U.S. Cl............... 320/17, 310/198, 320/61, 322/90
[51] Int. Cl............................................. H02j 7/14
[58] Field of Search............... 320/15–18, 61–65; 322/28, 90; 310/126, 198; 307/66

[56] References Cited
UNITED STATES PATENTS
2,677,798  5/1954  Bekey.................... 307/66 X
3,160,772  12/1964  Miron.................... 322/90 X
3,267,353  8/1966  Franklin................. 322/90
3,555,395  1/1971  Beery.................... 320/15 X FOREIGN PATENTS OR APPLICATIONS
159,370  10/1954  Australia................. 320/16

Primary Examiner—James D. Trammell
Assistant Examiner—Robert J. Hickey
Attorney, Agent, or Firm—Fryer, Tjensvold, Phillips & Lempio

[57] ABSTRACT

A plurality of AC windings are disposed to share a common magnetic field circuit, to define a like plurality of electrically isolated, multiple-phase, stator windings on the same mechanical structure of an alternator. The plurality of multiple phase windings feed full wave rectifiers to supply a like plurality of outputs of selected voltage levels. Relay switching provides controlled output levels to loads of differing voltage requirements, regardless of unbalance in the loading of the plurality of stator windings.

6 Claims, 4 Drawing Figures

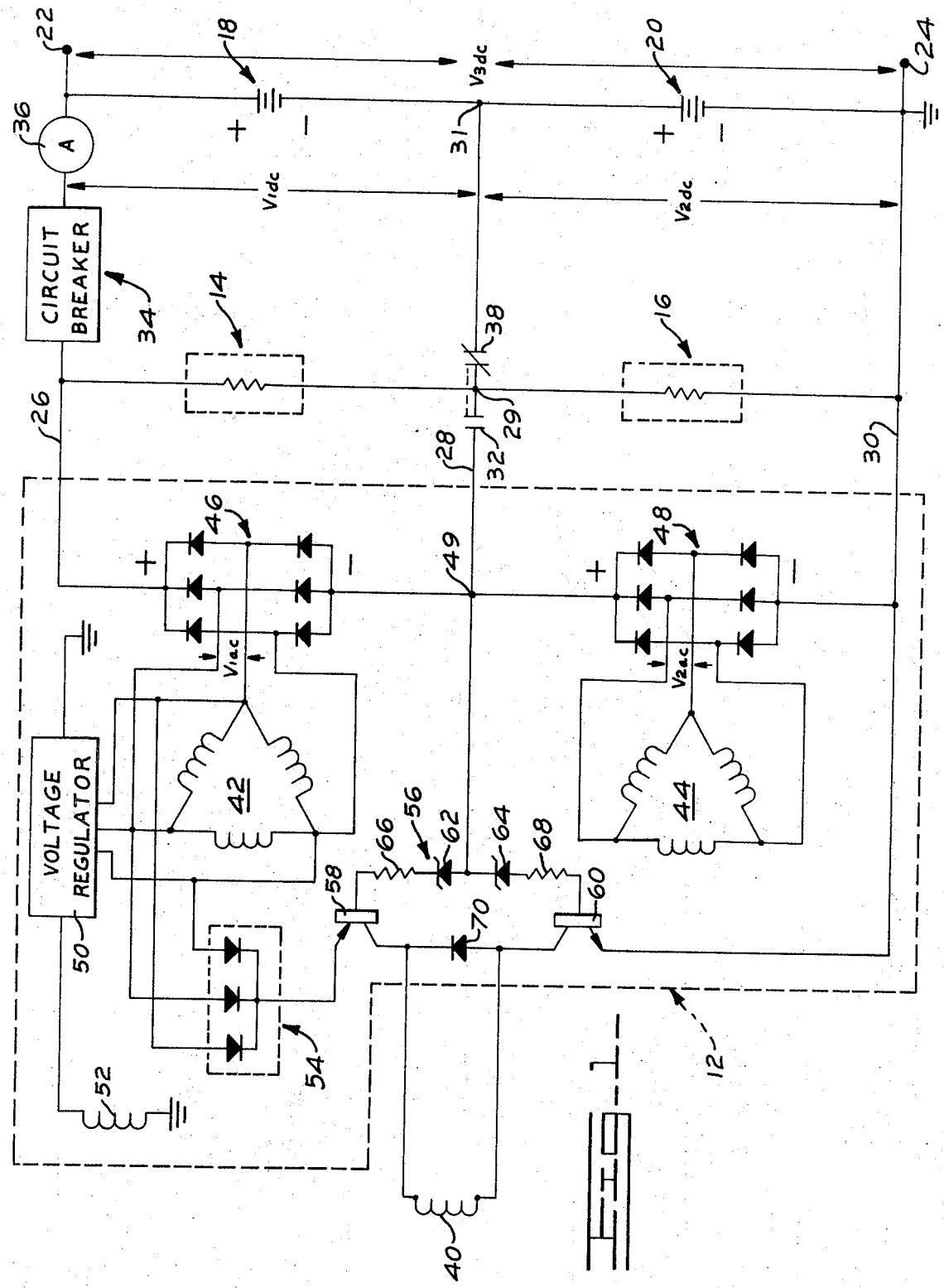

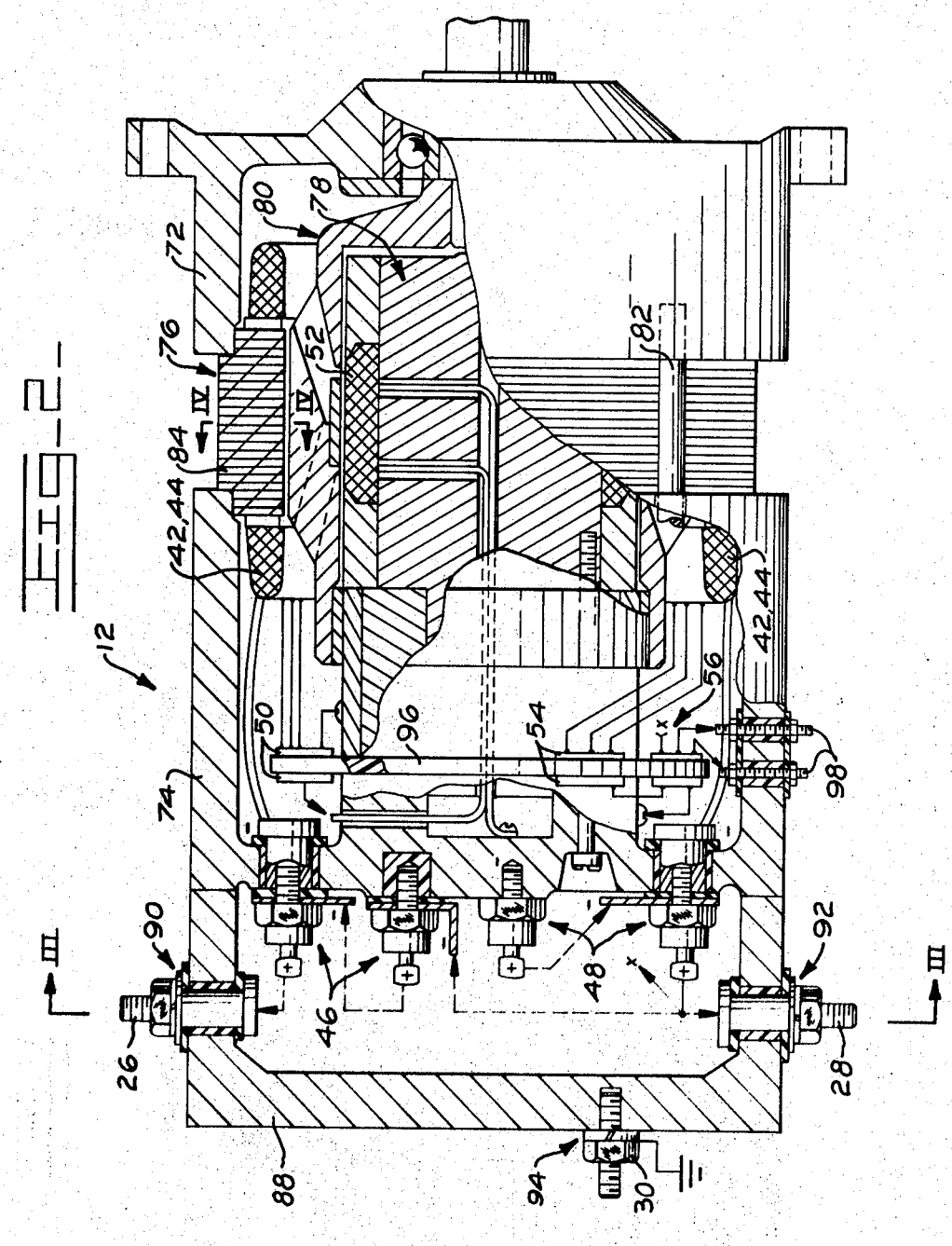

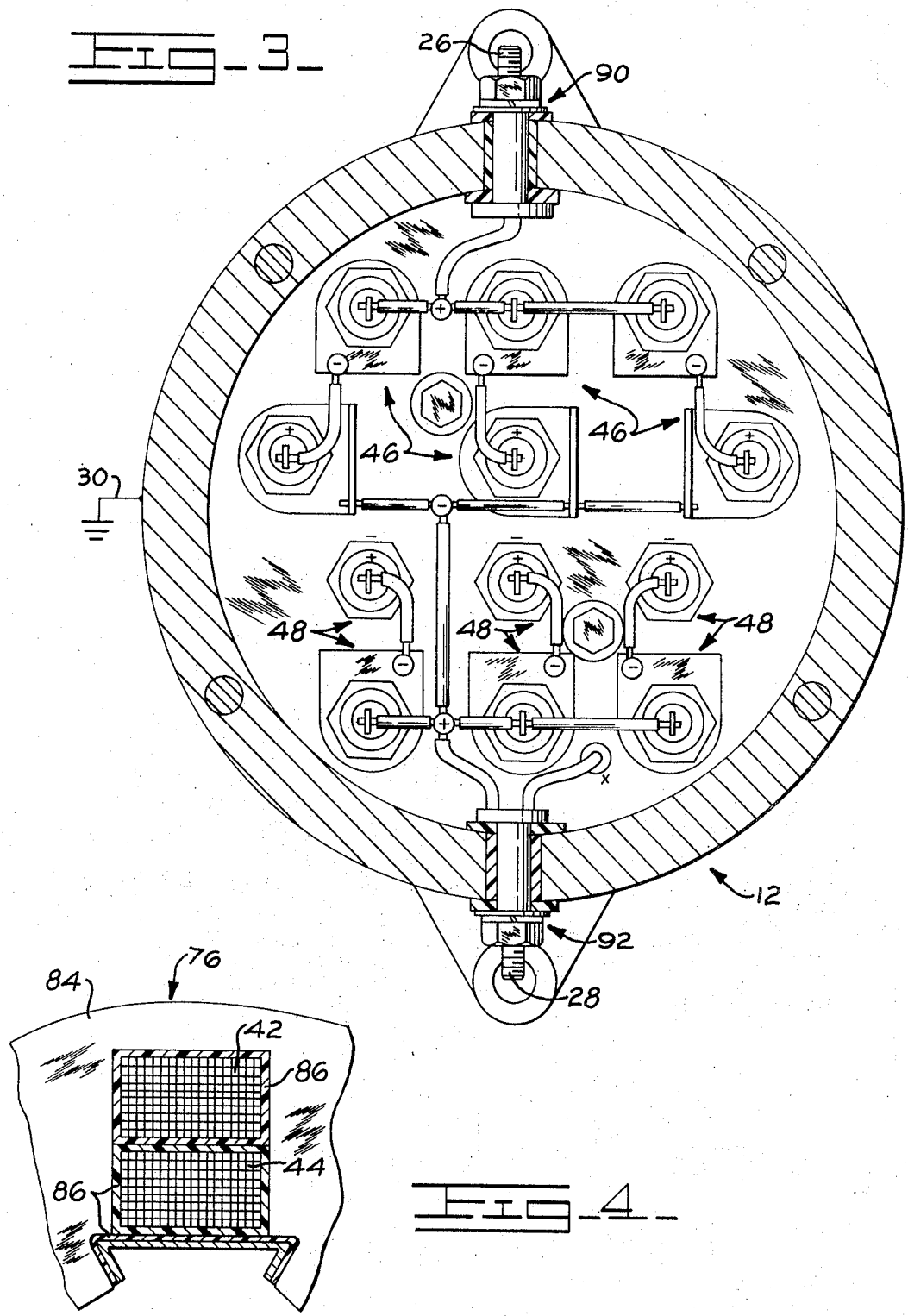

A MULTIPLE WINDING, MULTIPLE VOLTAGE, ALTERNATOR SYSTEM

BACKGROUND OF THE INVENTION

It is desirable in many present day earthmoving, etc., vehicles to have more than one level of DC voltage available. A two level system is of particular value since most presently available accessory equipment is of lower voltage rating than the voltage level required to operate cranking motors for large engines. However, the voltage levels delivered must remain substantially constant, thereby providing a constant voltage ratio, under all conditions of loading.

Accordingly, prior art alternator systems are available for supplying accessory, charging and/or cranking voltage levels for vehicles. Typical of such prior art are those systems which generally employ two batteries, and a series - parallel switch means to connect them in series for cranking, and in parallel for charging the batteries and/or for operating the accessory equipment. The disadvantage of this system is that the series - parallel switch must carry cranking motor current at prohibitive levels of several hundred amperes. In addition, parallel operation of batteries causes problems if their charge and discharge characteristics are not identical; circulating currents between batteries may give rise to unequal loading, etc.

Other prior art systems obtain different voltage level outputs from a vehicle alternator by employing a tapped transformer arrangement between the alternator and the loads. However transformers are extremely bulky and heavy, and cannot be located within a single alternator housing. Still other alternator systems employ separate windings on a generator to produce a low voltage DC directly for battery charging and accessory operation, and an AC voltage via slip rings for operating AC appliances.

SUMMARY OF THE INVENTION

The present invention relates to a multiple winding, multiple output, electro-mechanical energy conversion system, and more particularly to an alternator system for supplying multiple DC voltage levels to accessory, cranking, and charging circuits of vehicles.

The shortcomings of the prior art are circumvented by the invention which provides two AC windings in a common magnetic field sharing arrangement on the same mechanical structure. The two AC windings are coupled to respective full wave rectifiers, which supply vehicle accessory and battery charging circuits. The system is arranged to always supply the accessory loads by the rectified output of one of the rectifiers or from one of two batteries. A solid state relay/switching circuit controls the current path through the accessory load and allows protection from overvoltage due to unbalance in the loading of the two stator windings. Relay switching causes the batteries to always charge in series from the additive rectified outputs of the two stators. First and second voltages are available for the accessory load while the sum of these two voltages is available for battery charging or starting motor cranking. The invention thus contemplates multiple levels of DC voltages that are regulated to desired levels, wherein the ratio of the voltages remains substantially constant under all conditions of loading.

In the invention alternator system, the batteries are never operated in parallel, thus there can be no circulating currents between batteries as is the case in the prior art systems of previous mention if the charge or discharge characteristics are different. Therefore, the invention apparatus circumvents the disadvantages inherent in the prior art system which employs high current, series - parallel switches with attendant undesirable parallel battery charging. Likewise, the invention allows a dual voltage alternator system without requiring bulky or heavy transformers, while all components except the switching relay are contained within a single alternator housing.

BRIEF DESCRIPTION OF THE DRAWINGS

FIG. 1 is a circuit diagram illustrating one embodiment of the invention.

FIG. 2 is a cross section of an alternator structure associated with the circuit of FIG. 1, in accordance with the invention.

FIGS. 3 and 4 are cross sections taken along section lines 3—3 and 4—4 respectively of FIG. 2.

DESCRIPTION OF THE PREFERRED EMBODIMENTS

The present invention contemplates the generation of DC voltage from an alternating voltage, by some means that assures a unidirectional flow of current. By way of illustration only, and to simplify the description of the invention, there is shown an embodiment of the invention wherein the generated AC voltage is balanced three-phase and the rectification is accomplished by a three-phase full wave bridge using diodes as the rectifying element. However, the invention is not limited to this method of rectification, nor to the use of a three-phase source. The AC voltage source may be a one, two, etc., phase source, and the rectification may be accomplished mechanically as well as electrically.

Furthermore, although two levels of output voltage are described in the embodiment shown in the figures, three, four, etc., DC voltage levels may be available by employing for example two, three, etc. sets of windings in the AC voltage source. It is not necessary that the sets of windings all be in the same phase, neither is it necessary that all the levels of DC voltage be distinct. Accordingly, various alternative embodiments and modifications are contemplated by the invention combination.

By way of explanation, the invention combination contemplates providing m-levels of DC voltage (where $m = 3, 4$, etc.) which are regulated to pre-determined levels, wherein the ratio of the voltages remains approximately a constant under all conditions of loading. If the ratio of the DC voltages is to remain constant under all conditions of loading, the ratio of the AC voltages introduced to the rectifiers should also remain constant. The rectifiers are assumed to be 100% efficient.

For the invention combination described in the figures, $n$ - sets of windings (where $n = 2, 3$, etc.) share a commom magnetic circuit which assures that the integrally generated electromotive forces (EMF) of the various windings, maintain a constant relationship under all conditions of loading. It follows that any variation in the ratio of the DC voltages is thus the result of an unequal ratio of internal voltage drops in the AC windings of the electromechanical converter. This internal drop will have a resistive and a reactive component. The n- sets of winding are wound in such manner that the coefficient of the magnetic coupling for all windings is near unity. If the coefficient of coupling were in fact equal to unity, the reactive portion of the internal voltage drop in the windings would be equal, regardless of loading. Thus, there remains only the resistive portion of the internal voltage drop to contribute to a difference in the ratio of magnitudes of the DC voltages. The invention contemplates circumventing the latter problem by selecting a winding configuration and conductor size combination that makes the resistance of the windings as small as possible, while still meeting the voltage requirements without violating the unity coefficient of coupling between the $n$ - sets of windings.

Referring to FIG. 1, a dual-voltage alternator system in accordance with the invention, includes alternator means 12 in combination with accessory loads 14, 16 serially coupled across the output of the alternator means 12. Batteries 18, 20 are in turn coupled across the loads 14, 16 respectively, whereby terminals 22, 24 are provided across the serially connected batteries 18, 20. Alternator means 12 includes three output lines 26, 28, 30, wherein line 30 is coupled to ground, as is the output terminal 24.

Output line 28 is coupled to a common junction 29 between accessory loads 14, 16 via normally opened relay contacts 32, with the opposite ends of loads 14, 16 being coupled to output lines 26, 30 respectively. Output line 26 is in turn coupled via circuit breaker means 34, and current indicating means 36, to the positive side of the battery 18 and output terminal 22. A common junction 31 between the negative side of battery 18 and the positive side of the battery 20 is in turn coupled via a normally closed relay contact 38 to the common junction 29 between loads 14, 16. The negative side of battery 20 is grounded.

Normally open and normally closed relay contacts 32, 38 respectively are switched via an associated relay coil 40, as further described below. The invention combination is accordingly illustrated herein by the particular combination of the alternator means 12 and its connections with the loads 14, 16 the batteries 18, 20 and the output terminals 22, 24 which herein are utilized as connections to the cranking motor for starting the vehicle.

Regarding the alternator means 12, a production alternator may be modified in accordance with the invention to provide two isolated, but identical delta-connected stators 42 and 44. The outputs from the stators 42, 44 are coupled to three-phase rectifier bridge means 46, 48 respectively (hereinafter termed rectifiers 46, 48), each of which have positive and negative outputs. The positive side of rectifier 46 is coupled to output line 26 while the negative side thereof, as well as the positive side of rectifier 48, are coupled via a common junction 49, to the normally opened relay contacts 32 by way of the output line 28.

The output of stator 42 is also connected to a generally conventional voltage regulator means 50, and thence to a field winding 52 which supplies the alternator field. In addition, the output of the stator 42 is coupled to an auxiliary rectifier set 54 and provides a voltage to a solid state control circuit 56, which voltage is equal to the charging voltage set by the voltage regulator 50.

Regarding the control circuit 56, the bases of a pair of transistors 58, 60 are coupled to respective Zener diodes 62, 64 via resistors 66, 68 respectively. The anode and the cathode of Zener diodes 62, 64 respectively are coupled together, and thence to the common junction 49 between the rectifiers 46, 48. The cathode and anode of a diode 70 are respectively coupled to the collectors of transistors 58, 60. The relay coil 40 of previous mention is coupled across the diode 70. The emitter of transistor 58 is coupled to the output of the auxiliary rectifier set 54, while the emitter of transistor 60 is coupled to ground.

To provide the proper electrical isolation between the sources delivering voltages $V_{1ac}$ and $V_{2ac}$, the two three-phase stators 42, 44 are wound upon the same mechanical structure in electrically insulating relation (further discussed below). Further, to obtain multiple levels of DC voltages, e.g., voltages $V_{1dc}$, $V_{2dc}$, and $V_{3dc}$, the outputs of the rectifiers 46, 48 must be added with proper polarity as discussed above relative to FIG. 1. Electrical loads connected between output lines 26, 28, lines 28, 30, and lines 26, 30, would receive DC voltages $V_{1dc}$, $V_{2dc}$ and $V_{3dc}$ respectively. Voltage $V_{3dc}$ is the sum of the voltages $V_{1dc}$ and $V_{2dc}$. As previously mentioned, it is desirable to obtain values of $V_{1ac}$ and $V_{2ac}$ as nearly equal in amplitude as possible such that $V_{1dc}$ equals $V_{2dc}$, with the total available DC voltage, $V_{3dc}$ therefore equal to twice the voltage $V_{1dc}$ or $V_{2dc}$ under all conditions of loading.

Accordingly stators 42, 44 are wound in mechanically close proximity, whereby they share the same magnetic path within the machine. Since the stators of 42, 44 have the same number of turns, and are subjected to identical magnetic flux generated by the field coil 52, both in magnitude and time rate of change, the generated EMF in the stator 44 will equal that generated in stator 42.

It is of concern that the terminal voltages $V_{1ac}$ and $V_{2ac}$ be equal in magnitude as previously mentioned. Since the generated EMFs are equal, any difference in the magnitudes of the terminal voltages will be caused by a difference in the internal voltage drops of the respective stators. Since the latter are wound with identical parameters, any difference in internal voltage drops therebetween will be a result of unequal loading across the output lines 26, 28 and 30, which would cause different currents to flow within the stators 42, 44. To circumvent the problem of internal voltage drop differences, the windings of the stators 42, 44 are provided with the common magnetic path within the alternator 12, to provide thereby a unity coefficient of coupling between the windings to thereby equalize the reactive portion of the internal voltage drops.

Notwithstanding, some small unbalances may still exist between the magnitudes of the voltages $V_{1ac}$ and $V_{2ac}$. As the load becomes unbalanced, the voltage across the lighter loaded rectifier (46, 48) increases to a prohibitive value at a lower degree of unbalance than desirable. That is, the lighter loaded rectifier exhibits negative regulation, while the heavier loaded rectifier exhibits positive regulation. Thus a battery connected across the lighter loaded rectifier experiences a larger charging voltage under conditions of unbalanced load than does the battery connected across the heavier loaded rectifier. Under such conditions the two batteries charge to different levels, which is undesirable.

Thus the invention combination contemplates removing the connection from the common junctions 29, 31 between loads 14, 16 and batteries 18, 20 respectively, and the batteries are connected in series across the total output of both rectifiers 46, 48. It follows that the stators 42, 44 carry the same charging current delivered to the batteries 18, 20, which tends to alleviate the problem of differences in the resistive portion of the internal voltage drops. Further if the total output of rectifiers 46, 48 defines the regulated voltage, then the regulation curve for both batteries is identical whereby both are charged to the same level.

However, when there is no power flowing from the rectifiers 46, 48, means must be provided to reconnect the common junction between loads 14, 16 with the common junction of batteries 18, 20, otherwise the loads 14, 16 define a voltage divider across the two series batteries. Should the loads be unbalanced, the voltage across the lightest load would rise to an excessive level.

Accordingly, relay contacts 32, 38 and relay coil 40 provide switch means for coupling and uncoupling the common junction 29 between the loads 14, 16 to and from the rectifiers 46, 48 and the batteries 18, 20. With the relay coil 40 disposed as depicted in FIG. 1, any unbalance across the loads 14, 16 maintains the connection between the common junction 29 and the common junction 31, via the normally closed relay contacts 28.

When the alternator system of the invention is charging however, the relay contacts 38 are opened and the normally opened relay contacts 32 are closed via action of the relay coil 40, to thus connect the common junction 29 to the common junction 49 between the rectifiers 46, 48.

Regarding further the operation of the invention combination, the voltage regulator 50 maintains the proper excitation voltage to the field winding 52 at engine speed above low idle for AC outputs from the stators 42, 44 that will provide, for example, DC outputs of 12 to 15 volts from the bridge rectifiers 46, 48. The outputs from the rectifiers 46, 48 are polarized as shown to provide the desired dual voltages to the load circuits, including accessory loads 14, 16, batteries 18, 20, and the 24–28 volt starter circuit (not shown) which is connected to the output terminals 22, 24. The solid-state control circuit 56 receives a voltage from the stator 42 which is equal to the charging voltage determined by the regulator 50. Thus the circuit 56 provides means for controlling the current flow in relay coil 40, and thus the position of the contacts 32, 38.

Accordingly, it follows that with the alternator means 12 at a standstill (no output) the loads 14, 16 are connected to the batteries 18, 20 respectively since relay coil 40 is not energized and the normally closed and normally opened relay contacts 38, 32 respectively, are as shown in the FIG. 1. This prevents the voltage divider action of previous mention. The voltage across the relay coil 40 is zero since the voltage from the battery 18 is blocked by the rectifier 46. In addition, the normally open relay contacts 32 prevent a closed circuit condition from the battery 20 through the rectifier 46.

On the other hand, with the alternator 12 in a charging condition, the voltage at the emitter of the (PNP) transistor 58 is equal to the charging voltage determined by the voltage regulator 50. The voltage between the rectifiers 46, 48 is half the total voltage. The voltages across the rectifiers 46, 48 are large enough for the Zener diodes 62, 64 to conduct, thereby turning on the transistor 58 as well as the (NPN) transistor 60. In this particular embodiment, by way of example only, the Zener diodes 62, 64 are rated at 9 volts, while the output of the rectifier 46, 48 is 12–14 volts when the alternator is charging. When both transistors 58, 60 conduct, coil 40 is energized, which opens the relay contacts 38 and closes the relay contacts 32. The batteries 18, 20 are now charged in series and loads 14, 16 are energized through the rectifiers 46, 48. The resistors 66, 68 are current limiting resistors.

During alternator shutdown, unbalanced loads may occur as, for example, when engine speed is at or below low idle, whereby the output of the alternator means 12 may not be sufficient to prevent voltage divider action of previous mention if the loads 14, 16 are unbalanced. The high voltage across one of the two stator delta connections, or the related rectifiers 46, 48, indicates a low voltage exists across the other, if unbalanced loads exist during engine and alternator shutdown.

Protection is accordingly provided in accordance with the invention by closing the relay contacts 32 and opening the relay contacts 38. Switching occurs when either of the outputs of the rectifier 46 or the auxiliary rectifier set 54 is less than either of the reference voltages of the Zener diodes 62, 64 (e.g., 9 volts). A voltage less than the reference of either Zener diode turns off its corresponding transistor (58, 60) and de-energizes the relay coil 40.

Referring now to FIGS. 2–4, there is shown in cross section the alternator means 12 configuration, including the diode rectifiers 46, 48, the dual, delta connected stators 42, 44, etc. FIG. 4 includes an enlarged cross section of two winding sections separated by insulation for illustration purposes.

Briefly, the modified alternator 12 (FIG. 1) comprises a drive end frame 72, a second end frame 74, a stator assembly 76, a field assembly 78 and a rotor assembly 80. The end frames 72, 74 and stator assembly 76 are held in fixed relationship with one another via bolts 82 which are suitably threaded or bolted into or between the frames. The stator assembly 76 includes the usual ring of stator iron 84, within which are wound the (three-phase) delta stators 42, 44 (FIG. 4). The stators 42, 44 are shown isolated from one another via insulation 86 by way of illustration only, since the stators 42, 44 are actually wound to share a common magnetic field circuit. That is, to insure close coupling to the common magnetic field from field winding 52, the three-phase stators 42, 44 are not necessarily isolated in each stator slot, as depicted in FIG 4. Insulated magnetic wire is used in interlayered configuration, and protects against shorts between the delta windings formed by the specific connections of FIG. 1 at the stub ends of the stators 42, 44.

The stator iron 84 may have a liquid-tight fit with the end frame 72, 74 to allow for oil cooling, such as that previously known in the art. Likewise, the rotor assembly 80 and field assembly 78 have a mechanical configuration generally corresponding to those previously described in the art. A housing 88 is secured to the second end frame 74 as by welding or bolts, and serves as support for terminals 90, 92, 94 which correspond to the output lines 26, 28 and 30 respectively of the invention circuit of FIG. 1.

The electrical components forming the circuit of FIG. 1 are similarly numbered in the mechanical apparatus of FIGS. 2 – 4. The diode rectifiers 46, 48 employ rectifier plugs of the type which are conventionally employed in alternators. However, the alternator configuration is further adapted with an insulated printed circuit board 96 suitably secured within the second end frame 74, and the voltage regulator 50, the auxiliary rectifier set 54 and the solid-state control circuit 56 components are mounted thereon within the alternator 10 assembly. Insulated connector terminals 98 are provided through the second end frame 74 to provide means for coupling the control circuit 56 to the relay coil 40.

There are various obvious modifications which can be made to the alternator structure which are not specifically shown in the FIGS. 2 – 4. For example, means for ventilating the alternator, or to seal the printed circuit board 96 from the alternator structure, is not shown since these features may be variously provided by several conventional methods. Furthermore, it is to be understood that the output voltages $V_{1dc}$, $V_{2dc}$, $V_{3dc}$, and associated alternating current voltages, may be varied from the 12 and 24 volt values depicted herein by way of example. The system will maintain the 2 to 1 ratio for any designated output from the two balanced stators 42, 44. Additionally, the alternator is depicted herein with the generated AC voltage as a balanced three-phase system with rectification accomplished via a three-phase full wave bridge means. However, the AC voltage source may be a single-phase, or a selected multiple-phase source, wherein the stators 42, 44 may employ a single or multiple number of windings to correspond therewith. Furthermore, additional single or multiple-phase stators simialr to 42, 44 may be employed to provide an expanded system of multi-level DC voltages, instead of the two levels offered by the arrangement shown herein.

We claim:

1. In a multiple output alternator system for supplying multiple voltage levels to respective accessory loads, batteries and starting motors of a vehicle, the system including an alternator structure having a stator assembly, a field assembly for generating a magnetic field circuit, and a rotor assembly rotatably disposed therebetween. the combination comprising;

a plurality of windings integral with said stator assembly to define stators which share a common magnetic field from the field assembly to provide a coefficient of magnetic coupling which approaches unity, wherein the windings deliver an associated plurality of AC outputs;

rectifier means coupled to the windings for receiving the plurality of AC outputs and for providing a plurality of DC outputs having a constant ratio of magnitudes under varying conditions of loading;

switch means including normally open and normally closed contacts operatively coupled between the rectifier means and loads, and the loads and batteries respectively, and including means responsive to selected voltage levels of said DC outputs for simultaneously reversing the position of said contacts in response to the generation of the selected voltage levels; and said alternator system further including a pair of accessory loads having a common junction therebetween;

a pair of batteries having a common junction between a negative and a positive side of said batteries; wherein said normally closed contacts are disposed between the common junctions of said loads and of said batteries, and said normally open contacts are disposed between the common junction of the loads and the rectifier means.

2. The alternator system of claim 1 wherein said stator assembly includes at least two stators; and said rectifier means includes a pair of rectifiers respectively coupled to the stators, each rectifier having positive and negative outputs, with a negative output of one rectifier coupled to the positive output of the other via a common junction; and said common junction is coupled in turn to the normally open contacts.

3. The alternator system of claim 2 wherein the switch means includes relay means associated with the normally open and normally closed contacts and disposed to sense the generation of the plurality of DC outputs and reverse the positions of the contacts.

4. The alternator system of claim 3 further including, voltage regulator means coupled to a first stator; auxiliary rectifier means coupled to the first stator; control circuit means coupled to the auxiliary rectifier means to sense a selected voltage level therefrom and to thus sense the generation of the plurality of DC outputs; and relay coil means coupled to said control circuit means to reverse the position of the contacts in response to the control circuit means; wherein said field assembly includes a field winding coupled to said voltage regulator means.

5. The alternator system of claim 4 wherein the stators include multiple-phase windings to provide a multiple-phase output; said rectifiers including associated multiple-phase elements adapted to receive the multiple-phase outputs from the respective stator windings and to deliver corresponding multiple-phase DC voltage levels.

6. The alternator system of claim 4 wherein the control circuit means further includes, first and second transistors, diode means disposed between the collectors of the transistors, a pair of Zener diodes connected between the bases of the transistors, wherein the emitter of the first transistor is coupled to the auxiliary rectifier means output, the emitter of the second transistor is coupled to ground, the junction between the pair of Zener diodes is coupled to the junction between the rectifiers, and said relay coil is coupled across the diode.

* * * * *